(12) United States Patent
Robbins

(10) Patent No.: US 6,323,845 B1
(45) Date of Patent: Nov. 27, 2001

(54) SINGLE FINGER CONTROLLED COMPUTER INPUT APPARATUS AND METHOD

(75) Inventor: Daniel C. Robbins, Durham, NC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/398,834

(22) Filed: Mar. 6, 1995

(51) Int. Cl.[7] .................................................. G09G 5/00
(52) U.S. Cl. ............................................ 345/168; 345/173
(58) Field of Search .................................... 345/168, 169, 345/171, 172, 173–178; 178/18, 19

(56) References Cited

U.S. PATENT DOCUMENTS

| | | | |
|---|---|---|---|
| 4,302,011 | 11/1981 | Pepper, Jr. | 273/85 |
| 4,550,221 | 10/1985 | Mabusth | 178/18 |
| 4,686,332 | 8/1987 | Greanias et al. | 178/19 |
| 4,692,756 | 9/1987 | Clark | 340/709 |
| 4,725,817 | 2/1988 | Wihlborg | 340/365 R |
| 4,862,151 | 8/1989 | Grauz et al. | 340/906 |
| 4,977,397 | 12/1990 | Kuo et al. | 340/710 |
| 5,008,497 | 4/1991 | Asher | 178/18 |
| 5,146,049 * | 9/1992 | Shima . | |
| 5,231,380 | 7/1993 | Logan | 340/706 |
| 5,241,308 | 8/1993 | Young | 341/34 |
| 5,327,161 | 7/1994 | Logan et al. | 345/157 |
| 5,341,133 | 8/1994 | Savoy et al. | 341/22 |
| 5,469,194 * | 11/1995 | Clark et al. | 345/163 |
| 5,502,460 * | 3/1996 | Bowen | 345/168 |

FOREIGN PATENT DOCUMENTS

| | | |
|---|---|---|
| 0201294 * | 11/1986 | (EP) . |
| 0506335 * | 9/1992 | (EP) . |
| 0551778 * | 7/1993 | (EP) . |

OTHER PUBLICATIONS

Ken Sakamura; "BTRON"; 7(1987) Apr.; IEEE No. 2 pp. 53–65.*

"Combined–User Interface For Computers, Television, Video Recorders, And Telephone, ETC."; IBM Technical Disclosure Bulletin, vol. 33 No. 3B; Aug./90; pp. 116–118.*

* cited by examiner

Primary Examiner—Richard Hjerpe
Assistant Examiner—M. Fatahiyar
(74) Attorney, Agent, or Firm—Nixon, Hargrave, Devans & Doyle

(57) ABSTRACT

A computer 10 has an input device 12 keyboard with two sets of input keys 14, 16 separated by a touch pad 20. The touch pad 20 is accessed by an operator's index finger from the home row of keys, typically the next to last row.

1 Claim, 3 Drawing Sheets

SINGLE FINGER CONTROLLED COMPUTER INPUT APPARATUS AND METHOD

This invention relates in general to computers, and in particular, to computer input devices.

BACKGROUND

Existing computer systems have numerous input devices. The most common input device is a standard keyboard. The standard keyboard comprises, at a minimum, four rows of keys with ten keys in each row. It is common practice that the four keys on each end of the next to the last row are home keys for the fingers of an operator. The operator's thumbs are used to actuate a space bar which may be considered as a fifth row. Another common computer input device is the mouse. The mouse includes a housing with a rotatable ball on the base of the housing. The ball is moved over a mouse pad. The top cover of the mouse has one or more buttons. In operation, the mouse is used to acquire control over the cursor on the display of a computer. The mouse includes an arrow display or mouse pointer. By moving the mouse pointer to any point on the display and actuating the mouse button one time, the display cursor is automatically moved to the position indicated by the mouse pointer. The mouse has other functions. If the mouse pointer is disposed over one or more graphical user interfaces that appear on display, the function indicated by the graphical user interface may be selected by clicking on the mouse. Still another function of the mouse is to select portions of the display for further operation. In a typical word processing operation, the mouse is positioned at the start of a text to be selected, a mouse button is held down; and then the mouse pointer is dragged over selected text. With the text selected, further functions may be performed on that text by entering commands from the keyboard or making further use of the graphical user interface with or without the mouse. For example, the text may be underlined, copied, set in a different font, etc.

There are other input devices that are somewhat similar in operation to the mouse. These devices include track balls, touch pads, and joy sticks. Joy sticks are more commonly used in connection with computer games since they normally require two hands for operation of all the joy stick controls. Some laptop computers have used small joy sticks located in the keyboard for controlling a pointer. Other input devices include track balls and touch pads. Track balls work similar to a mouse except the ball is disposed separate from the keyboard or fixed to one side and it is moveable by one or more fingers of the operator. Touch pads are also attached to either one side or the bottom of the keyboard or provided as separate input devices like the mouse. Touch pads provide an input system that is readily learnable by most operators. One advantage of the touch pad is that it uses an intuitive ability to point with one's index finger to a desired item.

SUMMARY

The invention provides a computer and a computer input apparatus and method with a highly intuitive touch pad input device. The computer of the invention has a central processing unit, a memory that holds data and an operating system, a visual display, and an input device with a touch sensitive input pad. The input device particularly comprises a keyboard that has a plurality of keys. Each key corresponds to one of a plurality of alphanumeric or punctuation characters. The keys are arranged in first and second sets. The sets are spaced apart from each other. The touch sensitive input pad is deposed in the space between the sets. Each set of keys has a plurality of rows including at least the four rows typical of keyboard. With an operator's fingers disposed on the corresponding home keys, the index fingers of the operator may readily access the touch pad which is spaced only one key away from the home key row. As such, in order to acquire control of the cursor and/or the touch pad pointer, an operator removes an index finger from a home key and places it on the touch pad. Once placed on the touch pad, a first pressure will acquire the touch pad pointer. The pointer on the display can be moved by simply sliding the index finger over the touch pad until the touch pad pointer is located at the desired final position on the display. At that time, a second, somewhat harder pressure is exerted on the touch pad in order to set the cursor to the position indicated by the touch pad pointer. The second pressure is also used to drag the pointer and thereby select large areas of the display.

As such, the touch sensitive pad generates one or more signals that correspond to different touches or different pressures applied to the pad by the operator. The first touch or first pressure generates an acquisition signal that enables the operator to acquire positional control of the touch pad pointer on the display. The second touch generally made with a pressure greater than the first touch will set the cursor to the position indicated by the touch pad pointer. When the touch pad pointer is disposed over an icon of a graphical user interface, the icon may be selected by two rapid touches on the touch pad. This operation is similar to the double clicking of a mouse.

The touch sensitive pad of the invention comprises a matrix of touch sensitive elements for generating different signals in accordance with the different touches of the pad. The touch pad provides either absolute or relative positioning of the cursor using a scale factor control. When using an absolute positioning, the preferred scale factor is one to four. The touch pad provides relative control of the touch pad pointer by dividing the display into a number of quadrant. With relative positional control, the margins of the touch pad generate marginal signals indicating that the user desires the touch pad pointer to cross from one quadrant to the next. By maintaining one's finger on the margin, the touch pad pointer will move in a step wise manner toward sequential quadrant align with the selected marginal position.

Another feature of the invention is that the touch pad is disposed on a moveable table. The moveable table may be translatable or rotatable into alignment with the index finger of the operator. Once set to its desired alignment, a keeper control maintains the table in the desired position. By moving the table to a desired position, an operator may customize the position of the table for access by one's left or right index finger. The touch pad may include one or more transducers such as piezoelectric, capacitive, resistive, or optical transducers.

DRAWINGS

DETAILED DESCRIPTION

Figure 1:
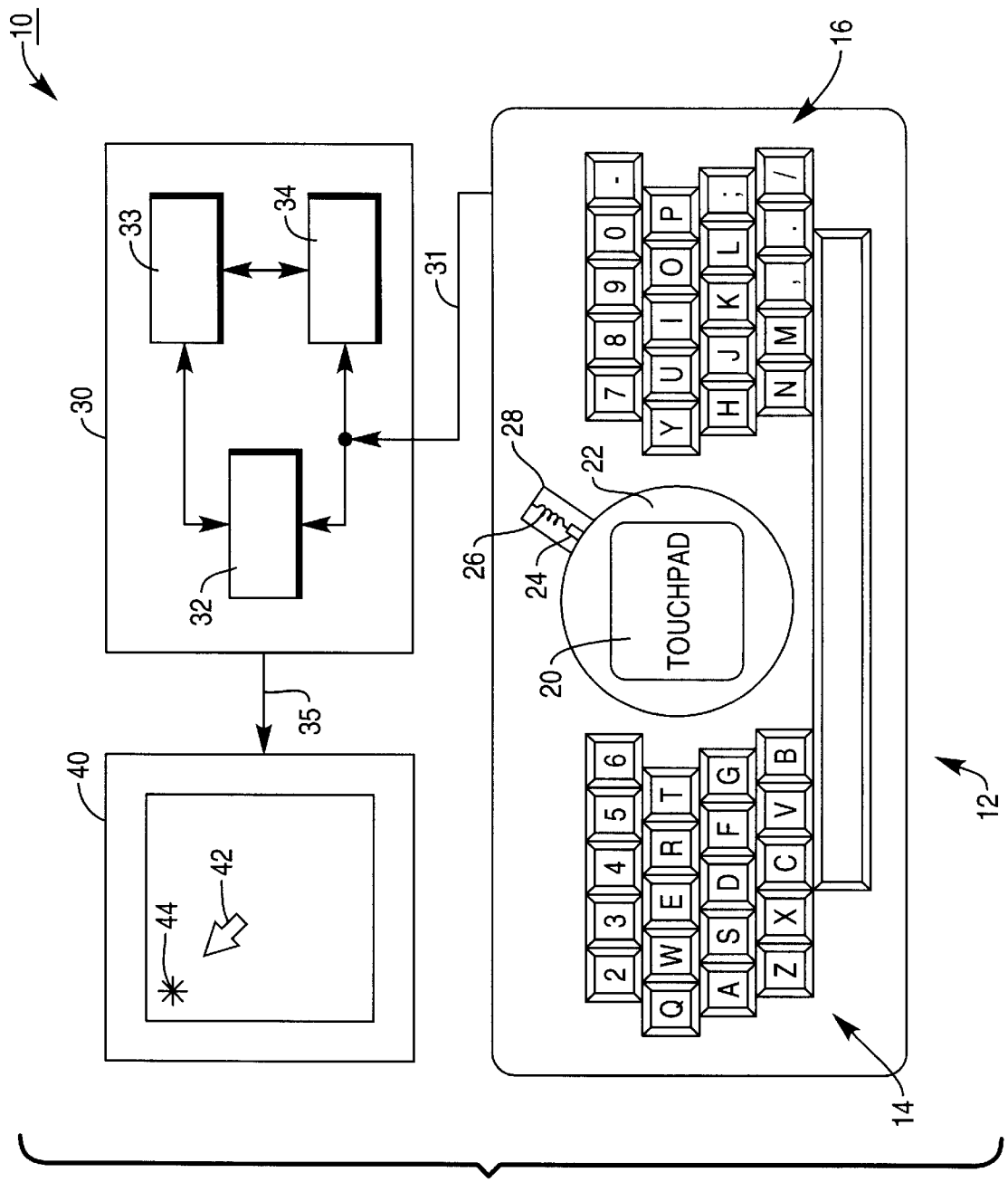
FIG. 1 is a schematic representation of a computer with a display and an input device of the invention.

Turning to FIG. 1 there is shown a computer 10 that includes a combined keyboard and touch pad input device 12, a central processing unit 30, and a display 40. The input device 12 is coupled by an input bus 31 to CPU 32 and RAM 34. ROM 33 includes a program for the operating system of the CPU 32 and also is adapted to send and receive data between the RAM 34 and the CPU 32. CPU 32 has a number of outputs including output line 35 which carry control signals to the cursor 44 and the touch pad pointer 42 on display 40. The input device 12 has first and second sets of keys 14, 16. A touch pad 20 is disposed between the two sets of keys. Each set of keys 14, 16 includes at least four rows. Each set of keys 14, 16 generally includes half of the keys of a normal typewriter keyboard. Of course, the input device 12 may include other keys including function keys, a number pad, and individual arrow-type cursor control keys. The touch pad 20 is optionally mounted on a moveable table 22. The table 22 is rotatable about a central access in order to align the touch pad with either the right or the left index finger of the operator. The operator's fingers are normally placed on home keys which include the four outer keys on opposite ends of the third row. The touch pad table 22 is held in place by a keeper mechanism which includes the stopper 24 that bears against the outer edge of the table 22 under the influence of a spring 26. The stopper 24 and spring 26 are disposed in a chamber 28 located beneath the surface of the keyboard 12. The stopper 24 fictionally bears against an outer cylindrical surface of the rotatable table 22 in order to releasably hold the table 22 in position.

Figure 2:
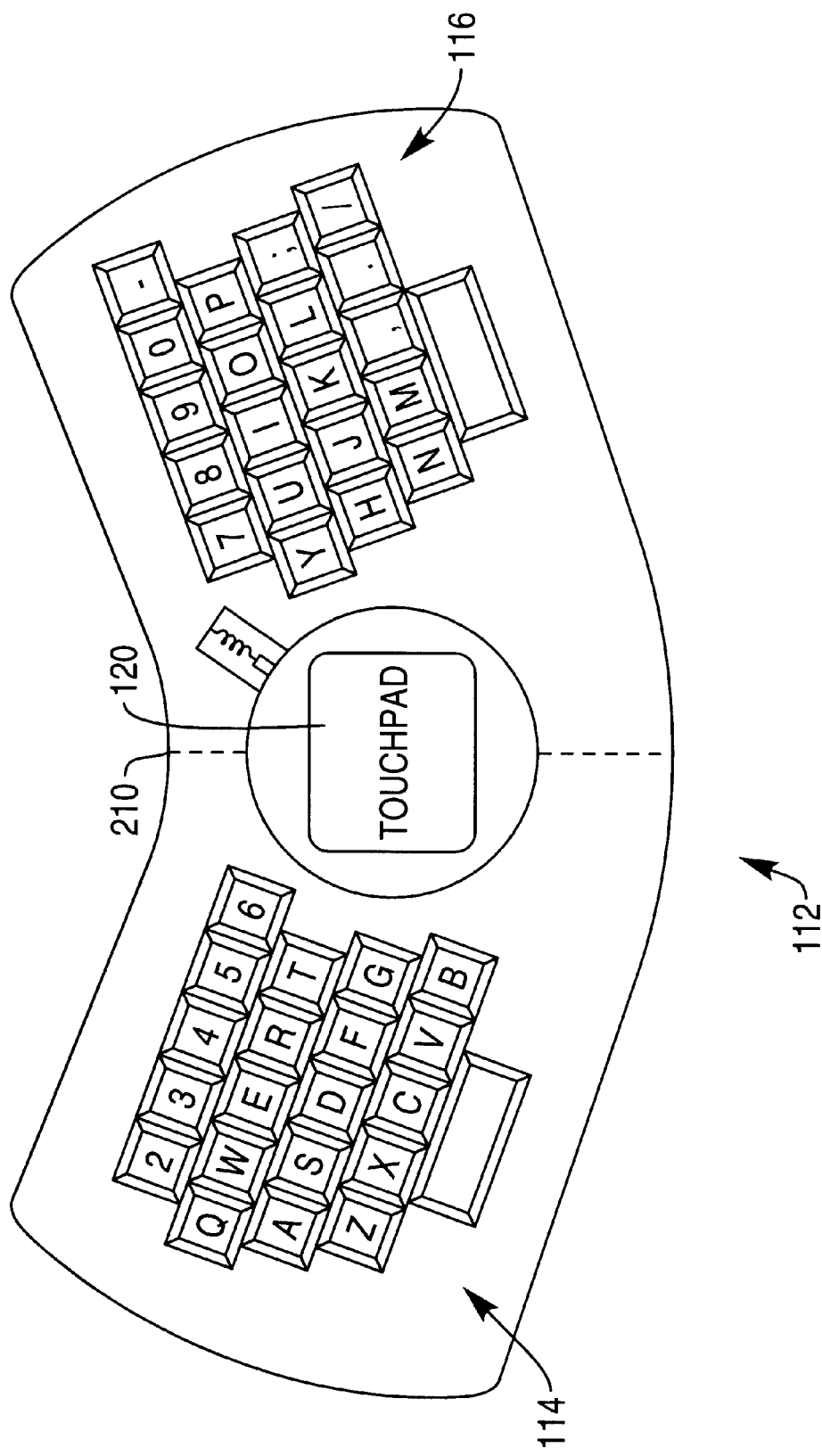
FIG. 2 is an alternate embodiment of the input device of the invention.

With reference to FIG. 2, there is shown an alternate embodiment of the invention disclosed in a v-shaped keyboard 112. The v-shaped keyboard 112 also has first and second sets of keys 114, 116 and a touch pad 120 disposed between the two sets of keys. The v-shaped keyboard 112 has further ergonomic advantages in as much as it allows the operators hands and fingers to move in a more natural fashion over the keys of the individual sets 114, 116. The keyboard 112 could be further modified to have key sets 114, 116 hinged at apex 210 and thus allow the angular orientation of keys 114, 116 to be adjusted by the operator.

With reference again to FIG. 1, the cursor 44 of the computer display 40 may be relocated to any position on the display 40 by moving the touch pad pointer 42 to the desired location. The touch pad pointer 42 is moved to its desired location by placing an index finger on the touch pad 20 and sliding the finger a distance proportional to the desired movement of the cursor 44. Once the pointer 42 is located at the desired position of the cursor 44, a second, greater pressure is exerted upon the touch pad 20. When the second pressure is exerted upon touch pad 20, the cursor 44 moves to the position of the touch pad pointer 42. Such movement of a cursor to a pointer position is a well known feature. Available software drivers for implementing such operation are stored in ROM or RAM.

Accordingly, the invention provides a natural way for an operator to point with an index finger to the desired location of the cursor 44 on the display 40. In contrast to prior art devices that require two fingers or a thumb and a finger, such as a track ball or an arm and two fingers and thumb, such as nonintegrated mouse or track ball, the invention requires only the use of the operator's index finger.

The touch pad 20 includes a position sensitive matrix that provides desired display accordance for the touch pad pointer 42. A switch disposed below the touch pad 20 is used to provide acknowledgement of the position to the CPU 32. As such, the invention uses the same touch to provide the position and acknowledgement of that position is simply accomplished by pressing slightly harder on the touch pad 20. Accordingly, the invention allows accurate positioning because the positioning input accordance are less likely to be erroneous at the time of user acknowledgement.

Figure 3:
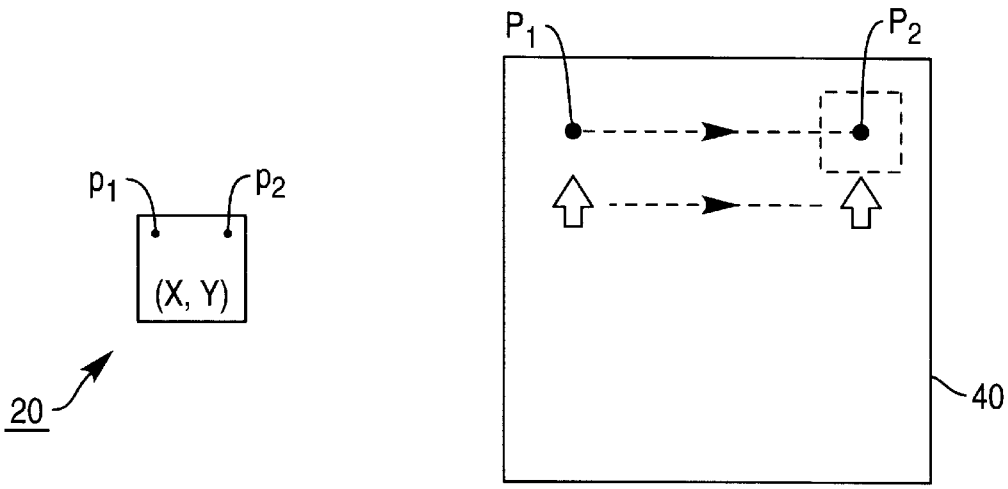
FIG. 3 is a schematic representation of the absolute positioning control of the invention.

The invention also provides for absolute as well as relative positioning of the touch pad pointer 42. With reference to FIG. 3, the touch pad 20 is illustrated as comprising an x,y matrix of points $p_1, P_2, \ldots pn$. In a similar manner, the display 40 also comprises a matrix of points $P_1, P_2$. In a typical absolute positioning system there is a ratio between the touch pad 20 and the display 40 identified as 1:K where K is equal to the display size matrix. A typical software routine for moving a touch pad pointer translates the matrix of the touch pad 20 into movement of the touch pad pointer 42. For example, if the display is 6 by 8 inches and the touch pad 20 is 1.5 by 2 inches the ratio of the touch pad 20 to the display 40 is 1:4 and so that touch pad pointer 42 would move four inches for every one inch of finger movement. As such, the user experiences the motion of the slide of his finger along the touch pad 40 and the corresponding motion of the touch pointer 42 as an absolute positioning correlation. In operation, the user would initially touch the touch pad at point $p_1$ which would correspond to the existing position of the touch pad pointer 42. Then, maintaining a light pressure on the touch pad 20 with an index finger, the user would slide his index finger from point $p_1$ to $P_2$. Such activity would result in the display in movement of the touch pad pointer 42 from $P_1$ to $P_2$. Once the touch pad pointer 42 reaches the desired position on the display of $P_2$, the user exerts additional pressure on the touch pad 20. Such additional pressure is interpreted by the CPU 32 as an instruction to locate the cursor 44 to the point $P_2$ on the display 40.

Figure 4:
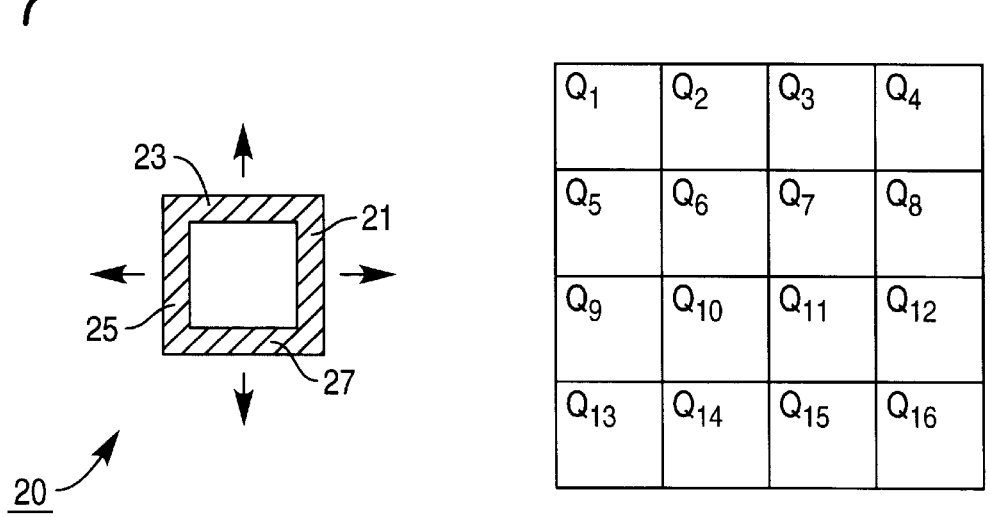
FIG. 4 is a schematic representation of the relative position control of the invention.

Turning to FIG. 4, there is shown the use of the invention in a relative positioning operation that provides higher resolution. In the embodiment shown in FIG. 4, the finger-to-screen relationship is altered to provide a 1:K of Q position where Q represents a screen quadrant and K represents the gain of the positional matrix. This relationship allows an index finger to move the touch pointer 42 and achieve an actual one to one relationship. It is also possible to achieve a relationship of less than one to one, if desired.

Let us assume the same sizes of touch pad 20 and display 40 as discussed above with relationship to FIG. 3. Furthermore, assume that the display 40 is divided into sixteen quadrants $Q_1 \ldots Q_{16}$. In addition, the touch pad 20 is further modified to have virtual edge boundaries 21, 23, 25, and 27. Now, each quadrant Q in the display 40 is 1.5 by 2 inches which is the same size as the touch pad 20. Assuming that the user starts in quadrant $Q_1$ and wants to move to quadrant $Q_4$ the user touches the pad 20 and moves to the edge 21 indicating a desirability to move to the right. Suitable software stored in RAM 33 or ROM 34 receives the signal from the virtual sensing edge 21 indicating that it was desired by the user to change quadrants. Thus, the touch pad pointer 42 would be step one quadrant at a time to the right until it entered the desired quadrant. Motion to other quadrants would be made by touching the other virtual sensing edges 23, 25, or 27 in order to move in the direction indicated by the arrows associated with those virtual sensing edges. Accordingly, to move down, one would move to the virtual sensing edge 27. To move to a quadrant on the left, the user would touch the virtual sensing edge 25 and to the move to a quadrant above an existing quadrant, the user would touch the vertical sensing edge 23.

Accordingly, the above description of the invention 10 provides a touch pad 20 that is ergonomically well placed in a keyboard 12. The touch pad 20 is readily accessible by either index finger of the user without the user having to remove other fingers from the keyboard. Accordingly, the invention 10 provides a more natural human interface for positioning the cursor 44 on a computer display 40. The invention provides a touch pad pointer display 42 which can be scaled and sized to the amount of space available on the keyboard 12. Accordingly, the invention 10 is suitable for use in with mainframe, mini, desktop computers, and workstations as well as with laptop and palm top computers. The touch pad 20 operates in a manner similar to a typical mouse inasmuch as only one "button" is needed i.e., the user needs to only press the touch pad 20 with first and second different pressures to actuate its different functions. Accordingly, the invention provides an ergonomic solution which allows rapid cursor control without requiring the user to remove his hands from the keyboard 12.

Having described the preferred embodiment those skilled in the art will appreciate that further modifications, alterations, and changes may be made to the disclosed embodiments without departing from the spirit and scope of the following claims.

What I claim is:

1. A computer with a central processing unit, a memory, a display and an input device, wherein said input device comprises:

a keyboard having a plurality of keys, each key corresponding to one of a plurality of alphanumeric and punctuation characters, said keys arranged in first and second sets, each set having a plurality of rows, each set having a home row of keys for normally receiving the tips of the fingers of an operator, said first and second sets spaced from each other, said keyboard having a switching matrix operatively associated with said keys for generating a computer input signal corresponding to the key operated by an operator; and a touch sensitive input pad disposed in the space between the two sets of keys and accessible by removing only one index finger from one of the home keys, wherein the touch sensitive input pad generates one or more signals corresponding to one or more different pressures applied to on the pad by the operator, wherein a first pressure generates a cursor acquisition signal for enabling the operator to acquire positional control of a cursor on a display coupled to the computer input device, wherein said display is divided into a plurality of quadrants, said touch sensitive input pad includes an edge boundary area, and said cursor advances directly from a first quadrant of said plurality of quadrants to a second quadrant of said plurality of quadrants in response to said operator applying pressure to said edge boundary area.

* * * * *